United States Patent Office
3,647,792
Patented Mar. 7, 1972

3,647,792
HETEROCYCLIC PYRAZINES
William J. Evers, Long Branch, Ira Katz, Elberon, Richard A. Wilson, Edison, and Ernst T. Theimer, Rumson, N.J., assignors to International Flavors & Fragrances Inc., New York, N.Y.
No Drawing. Filed May 4, 1970, Ser. No. 34,583
Int. Cl. C07d 51/76
U.S. Cl. 260—250 R                                      8 Claims

ABSTRACT OF THE DISCLOSURE

Processes for altering the flavors of products, including foodstuffs and tobaccos, which comprise adding thereto a small but effective amount of at least one heterocyclic pyrazine having the formula:

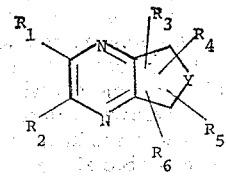

wherein Y is —O—, —S—, —CH$_2$—O—, or CH$_2$—S—, and R$_1$, R$_2$, R$_3$, R$_4$, R$_5$ and R$_6$ are the same or different and represent hydrogen and lower alkyl; the products so produced; flavoring and flavor-enhancing compositions containing such heterocyclic pyrazines; and novel heterocyclic pyrazines and processes for their production.

BACKGROUND OF THE INVENTION

The present invention relates to heterocyclic pyrazines and their use in processes and compositions for altering the flavors of various materials such as tobaccos, foodstuffs, and the like, as well as the novel pyrazines and processes for producing them.

Because of the tremendous consumption of foods, tobaccos, and other materials, there has been an increasing interest in substances and methods for imparting flavors to such consumable materials. This interest has been stimulated not only because of the inadequate quantity of natural flavoring materials available, but perhaps even more importantly, because of the need for materials which can combine several nuances, will be more stable than natural materials, will blend better with other flavors or flavoring composition components, and will generally provide superior products.

There have recently been suggestions that certain pyrazine derivatives have flavors which might be useful in foods and other consumable materials. For example, tetramethylpyrazine has been suggested for use with vanillin in chocolate flavors, acetylpyrazine has been used in tobacco and foods, and methoxypyrazine has been said to impart a nut-like flavor to foods.

THE INVENTION

It has now been found that heretofore unknown heterocyclic pyrazines are capable of imparting a wide variety of flavors to various consumable materials. Briefly, the invention contemplates altering the flavors of such consumable materials by adding thereto a small but effective amount of at least one heterocyclic pyrazine having the formula

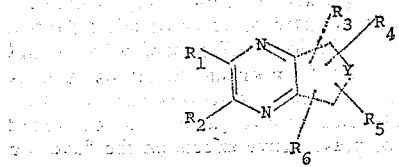

wherein Y represents —O—, —S—, —CH$_2$—S—, or —CH$_2$—O—, and R$_1$, R$_2$, R$_3$, R$_4$, R$_5$, and R$_6$ represent hydrogen, alkyl, or alkylene and are the same or different. The invention also contemplates flavoring and flavor-enhancing compositions containing such pyrazines, as well as the novel pyrazines and the processes for preparing them.

More specifically, the heterocyclic pyrazines according to this invention are pyrazines to the $b$ side of which are fused five- and six-membered oxygen- or sulfur-containing rings such as dihydrofuran, dihydrothiophene, dihydropyran, and the sulfur analog of such pyran. Such rings can be substituted with one or more alkyl or alkylene groups. The pyrazine ring can also be substituted with one or two alkyl or alkylene groups, and such substituents on the heterocyclic ring can, in some cases, be geminal. In some instances one or the other of the rings can be substituted with an alkadienyl group. It is generally preferred in practicing the present invention that the substitutent be hydrogen or a lower alkyl group, particularly alkyl groups having from one to six carbon atoms, and most preferably alkyl groups having from one to three carbon atoms.

Thus, the present invention contemplates 5,7-dihydrothieno[3,4-b]pyrazines having the formula:

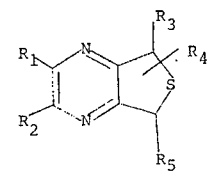

7,8-dihydro-5H-thiapyrano[3,4-b]pyrazines having the formula:

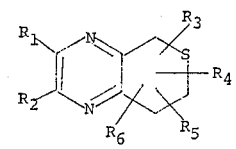

5,7-dihydrofuro[3,4-b]pyrazines having the formula:

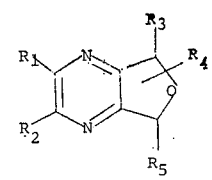

and 7,8-dihydro-5H-pyrano[3,4-b]pyrazines having the formula:

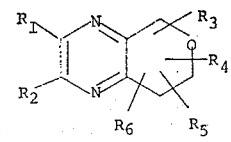

Exemplary of heterocyclic pyrazines prepared according to this invention is 2-methyl-5,7-dihydrothieno[3,4-b] pyrazine having the formula:

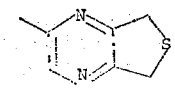

This material is a white crystalline solid having a roasted nut-like odor. Another pyrazine according to this invention is 5,7-dihydro-5,7-dimethylfuro[3,4-b]pyrazine having the formula:

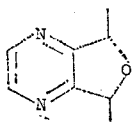

and a roasted aroma character. A further illustrative pyrazine according to this invention is 5,7-dihydrothieno[3,4-b]pyrazine having the formula:

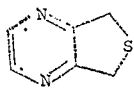

and being a solid melting at 88-89° C. with a roasted nut flavor.

The novel pyrazines prepared according to the present invention can be obtained by a number of reaction routes. The dihydrothienopyrazines can be prepared by reacting a 3,4-diaminothiophane or a mono- or dialkyl or -alkylene 3,4-diaminothiophane with an α-diketone under ring-closing conditions. The diaminothiophane and the diketone are admixed and a strong alkali metal hydroxide is added. The hydroxides of sodium or potassium are desirably used.

The alkaline mixture is then treated with oxygen at a temperature of from 15° to 50° C. to provide a satisfactory reaction rate while minimizing undesirable side reactions and the ebullition of the reactants. The oxygen can be pure or can contain inert diluents. It has been found desirable to use air as a source of oxygen.

The oxygen is added to the reactants by sparging or otherwise bubbling the gas through the reaction mixture. At the temperature used herein, the times for the reaction range from one to 24 hours, and it is desirable to carry out the reaction such that it attains a high degree of completion in from about 8 to 12 hours.

The reaction is desirably carried out in an inert reaction vehicle to permit better control over the reaction temperature and to improve mixing of the reactants. The preferred inert reaction vehicles are solvents and include alkanols, preferably lower alkanols such as methanol, ethanol and the like, oxygenated solvents such as ethyl ether, ethylene glycol, and the like.

After the reaction is completed, the pH of the reaction mixture is reduced by the addition of an acid, desirably a strong mineral acid such as dilute sulfuric acid, preferably 10% to 50% sulfuric acid. The pH need not be reduced to neutrality, but it is desirable that it be reduced to or below 9, and it is generally preferred to reduce the pH to 8.0-8.5, but not lower than about 7.

The dihydrofuropyrazines are conveniently prepared by reacting a vicinal alkadione dihalide with 1,2-diaminoethane or a mono- or dialkyl derivative thereof. Thus, a dione having the formula:

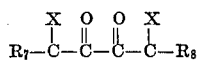

wherein each X is a halogen atom and $R_7$ and $R_8$ are hydrogen or lower alkyl can be used. In carrying out the process according to the present invention, the dichloro and dibromo derivatives are desirably utilized, and the dibromo derivative is preferred.

As taught above, a 1,2-diaminoethane is utilized. When the pyrazine ring of the heterocyclic pyrazine produced is to be mono- or dialkyl-substituted the diaminoethane can be 1-alkyl- or 1,2-dialkyl-substituted. In order to provide the preferred heterocyclic pyrazines, the alkyl group or groups substituent on the diaminoethane are lower alkyl, desirably having from one to three carbon atoms.

The reaction is carried out at low temperatures not substantially above 0° C., and temperatures down to −40° C., are utilized. At temperatures above 0° C. the reaction proceeds too vigorously, is difficult to control, and provides unwanted by-products, while at temperatures below −40° C. the reaction rate becomes very sluggish. It is accordingly desirable to utilize temperatures of from 0° to −40° C. Temperatures of from about −5° C. to about −20° C. are preferred.

After this first step of the reaction is completed, the mixture is oxidized under alkaline conditions to produce the dihydrofuran ring. The oxidation is carried out at an alkaline pH, desirably in the presence of an alcoholic alkali metal hydroxide. Preferred alcohols are the lower alkanols, particularly methanol and ethanol. Preferred hydroxides are sodium and potassium.

The temperature of the oxidizing reaction can range from 20° C. to 50° C. At higher temperatures the rings can be oxidized, and at lower temperatures the reaction proceeds with a very low velocity.

The thiapyranopyrazines are prepared by reacting 1,2-diaminoethane or 1-alkyl or 1,2-dialkyl derivatives thereof with 3-chlorothiapyran - 4 - one or alkyl-substituted derivatives thereof, desirably at the low temperatures described herein. The pyrans are similarly prepared from the reaction of such diamines with 3-chloropyrones or alkyl-substituted derivatives thereof. The pyrazine is produced from the reaction products by oxidation in the presence of alkalis as described above.

It will be understood by those skilled in the art that the intermediate and the final products prepared herein can be neutralized, washed, and dried to obtain the desired substances. The novel cyclic pyrazines can be obsained in purer form or in substantially pure form by conventional purification techniques. Thus, the products can be purified and/or isolated by distillation, extraction, crystallization, preparative chromatographic techniques, and the like. It has been found desirable to purify the heterocyclic pyrazines by fractional distillation under vacuum.

It will be appreciated from the present disclosure that the heterocyclic pyrazines and mixtures thereof according to the present invention can be used to alter, vary, fortify, modify, enhance, or otherwise improve the flavor of a wide variety of materials which are ingested, consumed, or otherwise organoleptically sensed. Such pyrazines are accordingly useful in flavoring compositions and in flavor-enhancing compositions. A flavor-enhancing composition is taken to mean one which contributes a part of the overall flavor impression by supplementing or fortifying a natural or artificial flavor in a material.

When the pyrazines of this invention are used in a flavoring or a flavor-enhancing composition, they can be combined with conventional flavoring materials including organic acids such as fatty, saturated, unsaturated, and amino acids; alcohols, including primary and secondary alcohols; esters; carbonyl compounds including ketones and aldehydes; lactones; other cyclicorganic materials including benzene derivatives, alicyclics, heterocyclics such as furans, pyridines, other pyrazines and the like; sulfur-containing materials including thiols, sulfides, disulfides and the like; proteins; lipids, carbohydrates, so-called flavor potentiators such as monosodium glutamate, guanylates, and inosinates; natural flavoring materials such as cocoa, vanilla, and caramel; artificial flavoring materials such as vanillin; and the like.

It will be appreciated that the types and amounts of materials selected from the foregoing groups of materials will depend upon the precise organoleptic character desired in the finished product and, especially in the case of flavoring compositions used to enhance other flavors, will vary according to the foodstuff to which flavor and aroma are to be imparted. Inorganic materials such as sodium chloride and freshness preservers such as butylated hydroxyanisole and propyl gallate can be added for their adjuvant or preservative effects on the flavoring composition.

The pyrazines, or the compositions incorporating them as mentioned above, can be combined with one or more vehicles or carriers for adding them to the particular product. Vehicles can be edible or otherwise suitable materials such as ethyl alcohol, propylene glycol, water, and the like. Carriers include materials such as gum arabic, carrageenan, other gums, and the like. The pyrazines can be incorporated with the carriers by conventional means such as spray-drying, drum-drying, and the like. Such carriers can also include materials for coacervating the pyrazines (and other flavoring ingredients, as present) to provide encapsulated products. When the carrier is an emulsion, the flavoring composition can also contain emulsifiers such as mono- and diglycerides of fatty acids and the like. With these carrier or vehicles the desired physical form of the composition can be prepared.

The pyrazines according to the present invention can be utilized in a wide variety of foodstuffs, tobaccos and other consumable products. As used herein, the term foodstuffs is taken to mean foods and beverages for human consumption and veterinary and other products, such as dog food, cat food, and the like. Thus, it will be appreciated that the pyrazines of the present invention can be used in snack foods, breakfast foods, baked goods, nut butters such as peanut butter and other spreads including cheese spreads, milk, butter and other dairy products, meat and poultry products, fried foods, and a wide variety of other materials.

It will be understood by those skilled in the art that the pyrazines according to this invention can be added to the materials to be flavored at any convenient point in production of the finished product. Thus, when the pyrazines are used to alter or otherwise vary the flavor of a foodstuff, they can be added in the original mixture, dough, emulsion, batter, or the like prior to any cooking or heating operation. Alternatively, they can be added at at later stage of processing if volatilization losses would be excessive during the earlier processing.

When the materials are used to treat tobacco products, for example, the additives can be applied in a suitable manner by spraying, dipping, or otherwise. Tobacco products will herein be understood to include those used for the production of pipe, cigar, and cigarette tobaccos, snuff, and chewing tobacco. The pyrazines can be applied to the "casing" or final spray treatment of the tobacco, or they can be applied at some earlier stage of curing.

The quantity of pyrazines or mixtures thereof utilized should be sufficient to impart the desired flavor characteristic to the product, but on the other hand, the use of an excessive amount of the pyrazines is not only wasteful and uneconomical but in some instances too large a quantity may unbalance the flavor or other organoleptic property of the product to be consumed. The quantity used will vary depending upon the ultimate foodstuff, tobacco product, or other consumable product; the quantity of flavor present initially in the product; the further process or treatment steps to which the product will be subjected; regional and other preference factors; the type of storage, if any, to which the product will be subjected; and the pre-consumption treatment, such as baking, frying, casing, and so on, given to the product by the ultimate consumer.

The ultimate compositions can accordingly contain from about 0.01 part per million (p.p.m.) to about 100 p.p.m. More particularly, in food compositions it is desirable to use from about 0.05 to about 50 p.p.m. and in certain preferred embodiments of the invention, from about 0.1 to about 20 p.p.m. of the pyrazines are included in the finished product. On the other hand, tobacco compositions can contain as little as 0.1 p.p.m. and as much as 100 p.p.m., depending upon whether a cigarette tobacco, a pipe tobacco, a cigar tobacco, a chewing tobacco, or snuff is being prepared.

All parts, proportions, percentages and ratios herein are by weight unless otherwise indicated.

The amount of pyrazine or pyrazines to be utilized in flavoring or flavor-enhancing compositions can be varied over a wide range depending upon the particular quality to be added to the foodstuffs, tobacco, or other consumable material. Thus, amounts of one or more pyrazines according to the present invention from about 0.1 up to 80 or 90% can be incorporated in such compositions. It is generally found to be desirable to include from about 0.5 to about 25% of the heterocyclic pyrazines in such compositions.

The following examples are given to illustrate embodiments of the invention as it is presently preferred to practice it. It will be understood that these examples are illustrative, and the invention is not to be considered as restricted thereto except as indicated in the appended claims.

Example I.—Preparation of methyl dihydrothienopyrazine

A 500 ml. flask is charged with 0.88 g. of 3,4-diaminothiophane in 100 ml. of 95% ethanol and cooled to −20° C., and a solution of 0.54 g. of pyruvic aldehyde in 50 ml. of 95% ethanol is added during 15 minutes. After warming to room temperature 0.27 g. of sodium hydroxide in 20 ml. of 95% ethanol is added, and the mixture so formed is heated at reflux for two hours. After cooling, solvent removal in vacuo gives a brown tar. Trituration with methylene chloride, followed by solvent removal in vacuo, gives 0.70 g. of residue. Column chromatography followed by preparative gas chromatography gives a white crystalline sample of 2-methyl-5,7-dihydrothieno[3,4-b]pyrazine.

Mass spectroscopy of the white crystalline solid so produced shows peaks of m/e ratios of 152, 151, 39, 41, and 57. UV (ultraviolet) spectroscopy shows $\lambda_{max}$ at 213 and 276 m$\mu$ with a shoulder at 307 m$\mu$. PMR (proton magnetic resonance) in deuterochloroform shows a singlet at 8.24 accounting for one proton, a singlet at 4.23 accounting for four protons, and a singlet at 2.55 accounting for three protons. This substances has a roasted nut aroma. It can be used in flavoring food and tobacco products, both to provide popcorn or roast cereal flavor notes and to enhance and interact with other fragrances and flavor notes.

Example II.—Preparation of dihydrodimethylfuropyrazine

A three-neck reaction flask fitted with a gas-inlet, thermometer, magnetic stirrer, and drying tube is charged with 2.0 g. (0.0073 mole) of 2,5-dibromo-3,4-hexanedione in 20 ml. of methanol. The mixture is cooled to −10° C. with stirring, and 0.44 g. (0.0073 mole) of 1,2-diaminoethane is added. The temperature rises to −5° C. during the addition, and the reaction mixture is then stirred at −10° to −20° C. for two hours.

A pellet of potassium hydroxide is added and air is bubbled through the mixture. The mixture is permitted to reach room temperature while the air is being added, and an additional small quantity of a solution of sodium hydroxide in methanol is added. The air bubbling is continued for an additional eight hours.

The oxygenated mixture so obtained is poured into 10 ml. of water and pH is adjusted to 8 with 20% aqueous hydrochloric acid. This mixture is then extracted five times with 50 ml. portions of methylene chloride. The extracts are dried over sodium sulfate, filtered, and concentrated to obtain 0.5 g. of a dark brown oil.

The oil is resolved by gas-liquid chromatography (GLC) to obtain 5,7-dihydro-5,7-dimethylfuro[3,4-b]-pyrazine. This material has a sweet roasted aroma in a one percent ethanol solution. PMR analysis confirms its structure.

In a one p.p.m. aqueous solution, this material is near the threshold level of its taste; in a 3 p.p.m. aqueous solution it has a popcorn flavor note; and at 10 p.p.m. it shows a roasted nut character, reminiscent of hazelnut and peanut. At 10 p.p.m. in a 10 percent aqueous sucrose solution, it provides a dominating roasted nut character.

At 3 p.p.m. in 4 percent aqueous salt solution it has a yeasty roasted taste, while at 10 p.p.m. it has a salted roast nut taste.

A chicken broth is prepared, and 3 p.p.m. of the material of Example II is added. The aroma and taste of roast chicken are imparted to the broth, and the general taste of the broth is improved. A beef broth is prepared, and 10 p.p.m. of the material of Example II is added. The material imparts a baked potato character to the broth. This furopyrazine is judged to be suitable for imparting roasted flavor notes to peanuts, and is also suitable for malt flavors.

Example III.—Preparation of dihydrothienopyrazine

To a refluxing solution of 5.6 g. of sodium hydrosulfide in 300 ml. of methanol is added a solution of 8.8 g. 2,3-di(chloromethyl)pyrazine in 25 ml. methanol during ten minutes. After refluxing for an additional 1.5 hours, the reaction mixture is allowed to stand at room temperature (about 23° C.) for 70 hours, and then refluxing is repeated for an additional three hours.

The mixture is cooled to room temperature and the methanol is removed to provide a dark brown solid. This solid is extracted with 300 ml. methylene chloride, and the methylene chloride is removed in vacuo to provide 5.3 g. of a brown oil.

The oil is chromatographed several times on silicic acid with methanol/methylene chloride mixture to provide a product which upon crystallization from a 95% ethanol solution yields 0.18 g. of 5,7 - dihydrothieno[3,4 - b] pyrazine.

This thienopyrazine derivative is a solid melting at 86–89° C. Sublimation in vacuo provides 0.10 g. of material melting at 88–89° C. Mass spectroscopy shows peaks at m/e ratios of 138, 137, 57, 41, 29, and 39. UV analysis shows a $\lambda_{max}$ at 211 and 255 m$\mu$ with a shoulder at about 309 m$\mu$. PMR in deuterochloroform shows a singlet at 8.36 accounting for two protons and a singlet at 4.26 accounting for four protons.

The odor of a 0.01 percent solution of this material in 95% ethanol is near the threshold level and is light roasted nut with a popcornlike note; at 0.1 percent in such ethanol, the odor is roasted nut, especially redolent of peanut and hazelnut. The taste of this material in water at the 0.02 p.p.m. level is characteristic of roasted peanut, bread crust, with an odor reminiscent of fresh milk; at 0.2 p.p.m., a baked goods, bread crust, roasted nut taste; at 2 p.p.m., a sweet characteristic nut flavor with no bitter aftertaste.

In sucrose solution at 4 p.p.m. the dihydrothienopyrazine has a flavor like baked goods, while at 3 p.p.m. in salt water there is a fried corn chip, salted peanut flavor character. This pyrazine derivative is suitable for roasted nut flavors, baked goods flavors, and other flavors.

Example IV

A cheddar cheese flavoring formulation is prepared by admixing the following ingredients in the amounts indicated:

| Ingredient: | Amount (parts) |
|---|---|
| Methyl hexyl ketone | 1.5 |
| Diacetyl | 14.2 |
| isoValeric acid | 40.8 |
| Hexanoic acid | 158.9 |
| Butyric acid | 244.8 |
| Caprylic acid | 534.8 |
| Dihydrothienopyrazine produced in Example I | 5.0 |

The foregoing cheese formula is incorporated into a bland cream cheese spread and evaluated on crackers. A good sharp cheddar flavor is imparted to the cheese spread.

What is claimed is:
1. A heterocyclic pyrazine having the formula

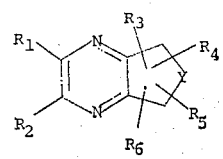

wherein Y is —O—, —S—, —CH$_2$—S—, or

—CH$_2$—O— and $R_1$, $R_2$, $R_3$, $R_4$, $R_5$ and $R_6$ are the same or different and represent hydrogen or lower alkyl having one to three carbon atoms.

2. A heterocyclic pyrazine according to claim 1 wherein Y is —S—.

3. A heterocyclic pyrazine according to claim 1 wherein Y is —S— and $R_1$ is methyl.

4. A heterocyclic pyrazine according to claim 1 wherein Y is —O— and $R_3$ and $R_4$ are methyl.

5. A process for preparing dihydrothieno pyrazines which comprises reacting 3,4-diaminothiophane or mono- or dialkyl-3,4-diaminothiophane with pyruvic aldehyde in the presence of an alkali-metal hydroxide and subsequently dehydrogenating the reaction product.

6. A process for preparing dihydrofuropyrazines which comprises reacting at a temperature of 0 to —40° C. a dicarbonylic material having the formula

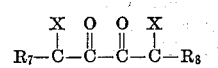

wherein each X is a halogen atom and $R_7$ and $R_8$ are hydrogen or lower alkyl, with 1,2-diaminoethane, 1-alkyl-1,2-diaminoethane, or 1,2-dialkyl-1,2-diaminoethane to obtain an intermediae reaction product and subsequently oxidizing the intermediate product at a reaction temperature of 20° to 50° C. to obtain the furopyrazine.

7. A process for preparing dihydrothienopyrazines which comprises reacting an alkali metal hydrosulfide with a 2,3-di(haloalkyl)pyrazine at a temperature of from 50–100° C.

8. A process according to claim 7 wherein the reaction is carried out in the presence of an inert reaction vehicle comprising a lower alkanol having from one to three carbon atoms.

References Cited

FOREIGN PATENTS 1,135,471  8/1962  Germany _____ 260—250

NICHOLAS S. RIZZO, Primary Examiner

U.S. Cl. X.R.

99—140